Patented May 21, 1940

2,201,273

UNITED STATES PATENT OFFICE 2,201,273

DISPERSION AND PROCESS FOR MAKING THE SAME

Frank K. Schoenfeld, Silver Lake, Ohio, assignor to The B. F. Goodrich Company, New York, N. Y., a corporation of New York No Drawing. Application February 10, 1938, Serial No. 189,837

4 Claims. (Cl. 260—763)

This invention relates to a process wherein pigments are dispersed in organic vehicles in the presence of a new dispersing aid, and to the dispersions produced by the new process.

It is often desired to disperse a pigment in an organic vehicle. Most paints and printing inks comprise dispersions of pigments such as metallic oxides and other inorganic and organic coloring powders in a suitable organic vehicle which is usually a drying oil, linseed oil being one of the most common. Black rubber compositions ordinarily comprise a dispersion of gas black in rubber. Many organic plastics and synthetic rubber-like materials have pigments dispersed therein to color the material or to provide other desired characteristics. To disperse pigments in organic vehicles, however, large energy inputs are required to overcome the internal friction of the vehicle, deflocculate the pigments, and create the pigment-vehicle interface. This is not only an expensive procedure due to the large amounts of power required, but the excessive mechanical working often leads to undesirable effects such as changes in the properties of the vehicle.

I have discovered that the time required to effect a dispersion of a pigment in an organic vehicle is materially shortened, a greater degree of dispersion is obtained, and more pigment can be dispersed in a given quantity of the vehicle by accomplishing the dispersion in the presence of minor proportions of oxygenated liquid rubber.

Liquid rubber is a well-known product made by heating rubber in any of its various forms such as caoutchouc, latex, balata, gutta percha, scrap vulcanized rubber or reclaimed rubber at atmospheric pressure or under a higher pressure until the residue remains liquid after cooling to room temperature. The oxygenated liquid rubber of this application is prepared in the presence of at least a trace of oxygen. Thus, oxygenated liquid rubber may be prepared by cracking in air with dry heat, or by heating rubber in a closed vessel with water containing dissolved oxygen to a temperature of about 250° C. for several hours. Rubber liquefied in the presence of hydrogen or of an inert gas containing no oxygen is not useful as a dispersing aid, but rather has the opposite effect in that it tends to prevent dispersion.

Oxygenated liquid rubber prepared by any desired method may be used in minor proportions to improve the dispersions of pigments in organic vehicles, the only restriction being that it must be possible to obtain some degree of dispersion of the pigment in the vehicle without the aid of oxygenated liquid rubber. The oxygenated liquid rubber may be incorporated in the vehicle before the dispersion of the pigment therein, or it may be mixed with the pigment before the dispersion or added to the vehicle simultaneously with the pigment. The dispersion may be accomplished by any of the well-known methods, the particular method employed depending principally upon the vehicle. When pigments are dispersed in linseed oil in the presence of a minor proportion of oxygenated liquid rubber in a paint mill a better dispersion is produced than by ordinary methods, which improved dispersion is evidenced by the greater intensity of color of the paint. It is also possible to disperse more pigment in the paint, and the same amount of pigment can be dispersed in a shorter time in the presence of oxygenated liquid rubber. Such a dispersed pigment has a retarded settling action, and does not form the hard cakes commonly encountered in paints.

The improvement in dispersion obtainable by the process of this invention is well illustrated by a series of experiments in which gas black was dispersed in rubber both in the absence of and in the presence of oxygenated liquid rubber. 199 parts by weight of crude rubber were masticated for four minutes in an internal mixer, the liquid rubber was added, and after two more minutes 170 parts of gas black were added in four equal increments at two minute intervals. The first sample for a dispersion test was taken two minutes after the last addition of carbon black. The dispersion was determined in the usual manner by tearing the rubber and calculating the ratio of the pigment surface covered by rubber to the total pigment surface, the glossiness of different portions of the surface and the presence of agglomerates being taken into consideration. The values for the dispersion of samples taken after different times of mastication are recorded below:

| Time in minutes after last addition of gas black | Parts of oxygenated liquid rubber added | | |
|---|---|---|---|
| | 0 | 2 | 5 |
| | Dispersion | | |
| 2 | .59 | .72 | .75 |
| 4 | .69 | .78 | .82 |
| 7 | .74 | .82 | .86 |
| 12 | .77 | .86 | .90 |
| 17 | .81 | .89 | .93 |
| 22 | .84 | .90 | .94 |

It can be readily seen that the dispersion was greatly improved when performed in the presence of the oxygenated liquid rubber. When other tests were made in which up to 20 parts of oxygenated liquid rubber were used, even greater improvements in the dispersion were obtained.

Although I have herein disclosed specific embodiments of my invention, I do not intend to limit myself solely thereto, for it will be obvious to those skilled in the art that many modifications are within the spirit and scope of my invention as defined in the appended claims.

I claim:
1. A process which comprises dispersing a pigment in rubber in the presence of a minor proportion of heat-liquefied oxygenated rubber.
2. A process which comprises dispersing gas black in rubber in the presence of a minor proportion of heat-liquefied oxygenated rubber.
3. A dispersion of gas black in rubber containing a minor proportion of heat-liquefied oxygenated rubber.
4. A dispersion of a pigment in rubber containing a minor proportion of heat-liquefied oxygenated rubber.

FRANK K. SCHOENFELD.